United States Patent [19]

Ristau

[11] 3,992,117

[45] Nov. 16, 1976

[54] SHAFT RETAINING RING

[75] Inventor: Theodore F. Ristau, Saginaw, Mich.

[73] Assignee: General Motors Corporation, Detroit, Mich.

[22] Filed: Mar. 27, 1975

[21] Appl. No.: 562,508

[52] U.S. Cl. .................................. 403/14; 403/359; 403/315; 285/321; 85/8.8
[51] Int. Cl.² ...................... B25G 3/00; F16D 1/00; F16G 11/00
[58] Field of Search .................. 403/13, 14, 4, 359, 403/DIG. 7, 315, 316, 344, 377, 332; 285/304, 308, 321, 1; 85/8.8; 151/69

[56] References Cited
UNITED STATES PATENTS

| 1,572,770 | 2/1926 | Colley | 151/69 |
| 1,741,093 | 12/1929 | Briggs | 403/DIG. 7 |
| 3,045,265 | 7/1962 | Seibert et al. | 85/8.8 X |
| 3,531,144 | 9/1970 | Bizilia | 403/359 X |
| 3,832,076 | 8/1974 | Gehrke | 403/359 |

FOREIGN PATENTS OR APPLICATIONS 980,814  1/1951  France .......................... 403/DIG. 7

Primary Examiner—Wayne L. Shedd
Attorney, Agent, or Firm—Ronald L. Phillips

[57] ABSTRACT

Spline members are retained together by a split retaining ring which is urged by a ramp on one of the members from an installation position into an assembly-disassembly position in an annular groove on the other member and on proper mating of the members assumes a retention position in this groove and in another groove on the one member which is ramped on one side to provide for disassembly by reversal of the assembly operation. To facilitate the assembly operation, the retaining ring is formed with its two end portions radially displaced over substantial distances from the normal circular shape so that the ring is supported along its entire length when in the installation position by the groove in the aforementioned other member.

2 Claims, 3 Drawing Figures

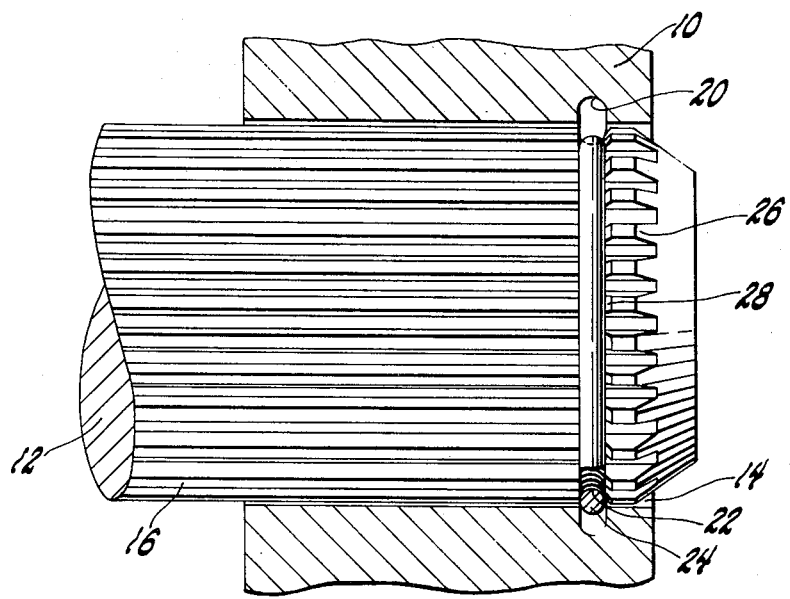
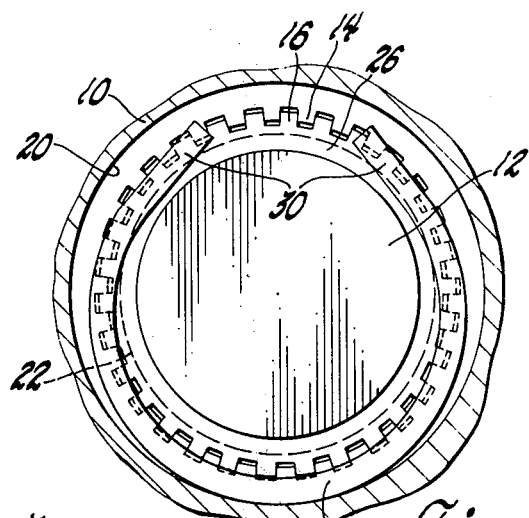
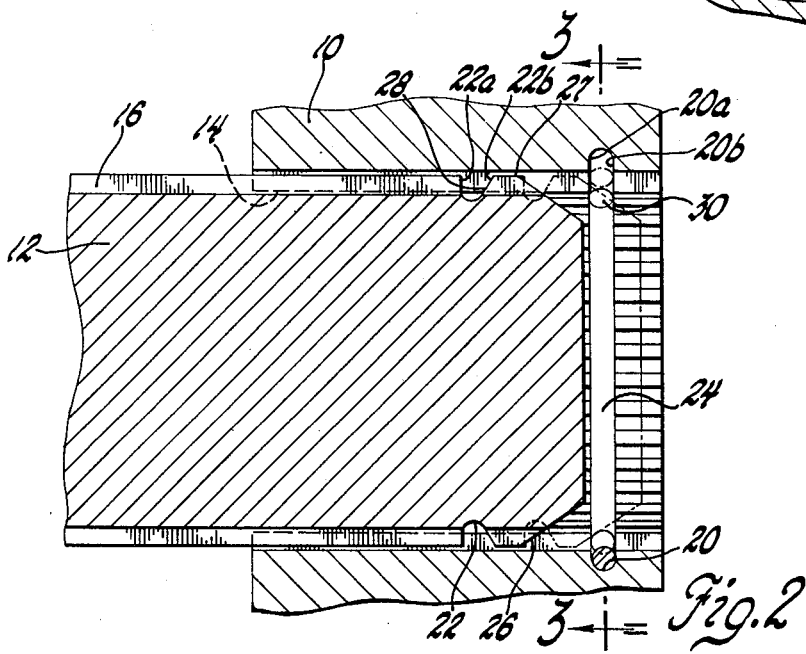

SHAFT RETAINING RING

This invention relates to a shaft retaining ring and more particularly to a shaft retaining ring which is split and has full support on one of the retained members for ready assembly operation.

For shaft retention it has been common practice to employ either one or two split retaining rings to maintain the shaft in proper relationship. In the case of the single retaining ring there is normally required a specially designed ring as well as a special accommodating space formed on one of the assembly members to receive the assembly tool for this ring. In the case of two retaining rings, there is normally required very close tolerances to prevent excessive axial play and there can be no blind side usage. A recent advance over these conventional type retaining ring arrangements which permits simple assembly and disassembly without special tooling while permitting retention groove location in noncritically stressed sections is disclosed in U.S. Pat. No. 3,832,076 assigned to the assignee of this invention. While this latter arrangement has proved satisfactory it has been found that during assembly, the ring which is split and has a circular shape may not remain centered and as a result prevent easy shaft entry. For example, when both of the members to be assembled are put in a horizontal position it has been found that the retaining ring can drop to the bottom of the ring groove on the member on which it is first installed. In this position a substantial portion of the ring is unsupported in the axial direction. Then when the assembly ramp on the other member makes contact with the unsupported portion of the retaining ring, it moves predominantly in the axial direction rather than in the desired radial direction. This axial movement tends to misalign the retaining ring wherein any further relative movement toward their assembled positions is prevented.

According to the present invention a very simple modification is made only to the split retaining ring in an assembly of the type in U.S. Pat. No 3,832,076 whereby the ring positively positions itself for the proper axial support along its entire length. As a result, the retaining ring is forced to move in the desired radial direction from its installation position to the assembly-disassembly position rather than in a misaligning axial direction which would prevent further relative movement of the members into their desired relationship. This modification in the preferred embodiment has the retaining ring reshaped by being radially outwardly displaced from the normal circular shape along substantial distances from the two ends whereby such radial displacement then serves to locate the ring for axial support along its entire length in its installed position in the retention groove on the shaft.

An object of the present invention is to provide a new and improved shaft retaining ring.

Another object is to provide a shaft retaining ring shaped so that it is supported along its entire length for forced movement from an installed position in a groove on one member into an assembly-disassembly position in a groove on the other member.

Another object is to provide a shaft retaining ring that is radially displaced along substantial distances from its two ends so that it is supported along its entire length when in an installed position in a groove on one member and can then be readily urged by a ramp on another member into an assembly-disassembly position in a groove on the latter member permitting proper assembly of the two parts to be retained by the ring then occupying both grooves.

These and other objects of the present invention will be more apparent from the following description and drawing in which:

FIG. 1 is a longitudinal view with parts in section of a splined assembly retained with a retaining ring according to the present invention.

FIG. 2 is a view similar to FIG. 1 but showing the shaft prior to its movement to the retention position wherein the retaining ring in an as-installed position is bottomed in the groove on the other member.

FIG. 3 is a view taken along the line 3—3 in FIG. 2.

Referring to FIG. 1 there is shown a splined assembly in a desired mating relationship that is maintained by a retaining ring arrangement constructed according to the present invention. The assembly comprises a housing 10 having an aperture receiving a shaft 12. The members 10 and 12 have equally angularly spaced mating splines 14 and 16 which prevent relative angular movement and permit relative axial movement.

The housing 10 has an annular radially inwardly facing retaining groove 20 in its aperture that is located radially opposite an annular radially outwardly facing retaining groove 22 on shaft 12 when the members 10 and 12 are in the desired mating relationship as shown in FIG. 1. The shaft's retaining groove 22 has a circular arc bottom, one flat side wall 22a perpendicular to the shaft axis and another flat side wall 22b inclined to the shaft axis for reasons which will become more apparent later. The housing's retaining groove 20 has a circular arc bottom and parallel flat side walls 20a and 20b perpendicular to the shaft axis. The members 10 and 12 are retained together by a split retaining ring 24 according to the present invention which is positionable to occupy both the retaining grooves 20 and 22 when they are radially aligned. The retaining grooves 20 and 22 intersect the splines 14 and 16 of the respective members 10 and 12 and the dimensions of these grooves and the retaining ring 24 are determined so that the retaining ring normally contracts into the shaft's retaining groove 22 as shown in FIG. 1 and is then in interference contact with the splines 14 and 16 between their tip and base diameters at the retaining groove intersections to thereby resist relative axial movement between the housing and shaft in either direction.

Automatic positioning of the retaining ring 24 to permit assembly and disassembly of the members without tools is provided by the housing's retaining groove 20 having a depth sufficiently greater than the depth of its splines 16 so that the retaining ring 24 is displaceable under radial outward load to an assembly-disassembly or noninterfering position within this retaining groove radially outward of or beyond the tips of the shaft splines 16. For positioning or forcing the retaining ring 24 into its assembly-disassembly position to permit assembly for later automatic positioning of the retaining ring 24 in its retention position, the shaft splines 16 at their right-hand end are chamfered so that they each have an identical assembly ramp 26. With the retaining ring 24 installed in the housing's retaining groove 20 and then on insertion of the shaft 12 into the housing 10 the housing's retaining groove side wall 20b holds the retaining ring 24 against the approaching assembly ramps 26 as shown in phantom-line in FIG. 2. Then on continued assembly force application the retaining ring 24 is forced to ride up the assembly ramps 26 and thereby expand radially outward to its assembly-disassembly position whereafter the shaft can then be readily moved toward the desired mating relationship with the shaft splines at their outer diameter or tips 27 maintaining the retaining ring in its noninterference position. When the retaining grooves 20 and 22 are radially aligned the retaining ring 24 is then relieved of this radially outwardly acting force and contracts radially inward to assume its retention position. Positioning of the retaining ring 24 in its assembly-disassembly position to permit disassembly is effected by the inclined side wall 22b of the shaft retaining groove 22 which provides identical disassembly ramps 28 on the shaft splines 16 whose inclination is opposite that of the assembly ramps 26. The disassembly ramps 28 limit axial play between the spline members and in response to a disassembly force opposite the assembly force the housing's retaining ring groove side wall 20a forces the retaining ring 24 against the disassembly ramps 28. Then on continued disassembly force application the disassembly ramps 28 force the retaining ring 24 to expand to its assembly-disassembly position in the housing's retaining groove 20 whereafter the shaft spline tips 27 then maintain the retaining ring in its noninterference position to permit easy disassembly of the members.

In such an assembly, it has been found that when the retaining ring has a circular or nearly circular shape there can be experienced an assembly problem wherein the ring does not remain centered and then prevents easy shaft entry. For example, with a circular retaining ring and during the assembly of the shaft and housing when they are both in a horizontal position, which is a typical case, the retaining ring drops to the bottom of the housing retaining groove. In this position, a substantial length of the ring, for example 70°, can then be unsupported in the axial direction. Then when the shaft assembly ramps make contact with this unsupported portion of the retaining ring, the ramps actually move the ring in a predominantly axial direction rather than in the desired radial direction toward the assembly-disassembly position. This axial movement tends to misalign the retaining ring with the housing groove and thus prevents any further movement of the shaft toward the desired retention position. According to the present invention a very simple modification is made to the retaining ring which assures axial support of the retaining ring in its as-installed position in the groove on the shaft to thus assure easy assembly operation. This modification in the preferred embodiment comprises bending or displacing the split retaining ring 24 radially outward from the normal circle along substantial distances measured inward from the two ends thereof such that the ring is then provided with straight and tangential end portions 30 as shown in FIG. 3. The length of the end portions 30 is determined so that when the ring is installed in the housing groove 20, the retaining groove still drops to the bottom of this groove but because of the straight end portions 30, the ring remains supported in the axial direction along its entire length by side 20b of this groove as can be seen in FIGS. 2 and 3. That is, the ring 24 in the installed position occupies at least some depth of the groove 20 along the entire ring length. Then when the assembly ramps 26 make contact with the retaining ring, the ring has to expand radially thus allowing the shaft to enter the ring freely with additional axial movement then being accomplished until the retaining ring is aligned with the groove in the shaft at which time the ring springs radially inward to assume its original shape within the housing and shaft grooves.

It will be appreciated by those skilled in the art that while the shaft retaining ring according to the present invention has been shown in a spline assembly it is, of course, applicable to other assemblies where only axial shaft movement is to be prevented.

The above described preferred embodiment is illustrative of the invention which may be modified within the scope of the appended claims.

I claim:

1. A shaft disengageably retained in a member having an aperture receiving said shaft, a radially inwardly facing circular retaining groove having a predetermined depth in said member aperture, a radially outwardly facing circular retaining groove having a predetermined depth in said shaft, a substantially circular resilient split retaining ring positioned in said retaining grooves when said grooves are radially aligned, end portions of said ring having substantial length extending outwardly from the normal circle of said ring, said ring having a dimension to occupy a portion of each of said grooves in interference contact with said shaft and said member resisting relative axial movement therebetween, an assembly ramp on one end of said shaft and a disassembly ramp on one side of said shaft retaining groove whereby forced axial displacement of said shaft in one direction relative to said member engages said assembly ramp with said ring moving it radially outwardly into said member groove to an assembly-disassembly position permitting said shaft to move through said ring until said grooves are radially aligned and said ring contracts into said shaft groove in a retaining position, forced axial displacement of said shaft relative to said member in an opposite direction engaging said disassembly ramp with said ring moving it to said assembly-disassembly position permitting movement of said shaft through said ring disconnecting said shaft, and said ring end portions positioning said ring in said member groove engaging said groove along its entire length assuring radial movement of said ring when engaged by said ramps.

2. A shaft disengageably retained in a member having an aperture receiving said shaft as described in claim 1 wherein said shaft and said member are provided with mating splines drivingly connecting them preventing relative rotation therebetween and said ring end portions extending straight and tangentially a substantial length from the normal circle of said ring causing engagement of said ring with said member groove along its entire length assuring radial movement of said ring when forced to its assembly-disassembly position in said member groove.

* * * * *